United States Patent [19]

Sauter et al.

[11] Patent Number: 4,972,744
[45] Date of Patent: Nov. 27, 1990

[54] TOOL TURRET WITH RAPIDLY ANGULARLY ADJUSTABLE TURRET HEAD

[75] Inventors: Willy Sauter, Reutlingen; Helmut Thumm, Metzingen; Erhard Obmann, Reutlingen, all of Fed. Rep. of Germany

[73] Assignee: Sauter Feinmechanik GmbH, Fed. Rep. of Germany

[21] Appl. No.: 358,005

[22] Filed: May 26, 1989

[30] Foreign Application Priority Data

May 26, 1988 [DE] Fed. Rep. of Germany ....... 3817937

[51] Int. Cl.$^5$ ............................................. B23B 29/32
[52] U.S. Cl. ..................................... 82/159; 74/813 L; 29/35.5; 29/48.5 R; 464/83
[58] Field of Search ......................... 82/159; 74/813 L; 29/35.5, 48.5 A, 48.5 R; 409/201; 464/74, 83

[56] References Cited

U.S. PATENT DOCUMENTS

| 4,168,639 | 9/1979 | Ingham et al. | 82/159 |
| 4,379,415 | 4/1983 | Klancnik et al. | 29/48.5 A |
| 4,467,680 | 8/1984 | Kettel | 82/159 |
| 4,468,991 | 9/1984 | Reusch et al. | 74/813 L |
| 4,706,351 | 11/1987 | Chuang | 29/35.5 |
| 4,819,311 | 4/1989 | Hashimoto et al. | 409/201 |

FOREIGN PATENT DOCUMENTS 3143999 6/1982 Fed. Rep. of Germany .
3134969 3/1983 Fed. Rep. of Germany .

Primary Examiner—Frederick R. Schmidt
Assistant Examiner—Mark A. Morris
Attorney, Agent, or Firm—Roylance, Abrams, Berdo & Goodman

[57] ABSTRACT

A tool turret has a locking mechanism part which can slide axially relative to the turret head. The locking mechanism part is aligned with annular gears of the turret head and of the housing. In its locked position, an annular gear on the locking mechanism part mates with the gears of the turret head and housing. An axial drive engages a control member which is rotatable relative to the locking mechanism part and has at least one curved sector. The curved sector has a shape for thrusting the locking mechanism part into its locked position by a continuation of the rotary movement of the control member relative to the locking mechanism part in the direction of the preceding rotary movement setting the new angular position of the turret head.

10 Claims, 3 Drawing Sheets

TOOL TURRET WITH RAPIDLY ANGULARLY ADJUSTABLE TURRET HEAD

CROSS REFERENCE TO RELATED APPLICATIONS

The subject matter of this application is related to U.S. patent application Ser. No. 07/357,518 of Willy Sauter, Helmut Thumm, Gunther Schips and Alfred E. Muller entitled Tool Turret, and to U.S. patent application Ser. No. 07/358,004 of Helmut Thumm, Walter Reusch, Gunther Schips and Willy Sauter entitled Tool Turret with Flexible Clutch, both filed concurrently herewith. The subject matters of both related applications are hereby incorporated herein by reference.

FIELD OF THE INVENTION

The present invention relates to a tool turret with a rapidly angularly adjustable turret head mounted in a housing for rotation about a rotary axis by a motor, and with a driven locking mechanism for retaining the turret head in a set angular position relative to the housing.

BACKGROUND OF THE INVENTION

A known tool turret disclosed in German patent No. 31 34 969 is provided with a cam drive to control the axial movement of the locking mechanism part. The driven part of the locking mechanism part has a cam section with middle segments aligned peripherally and with end segments aligned obliquely around the periphery of this driven part. The driven part is configured as a locking mechanism member, for instance as a cylinder, engaging in the cam section. Following the pivoting of the turret head, this member must be pivoted back to its index line.

SUMMARY OF THE INVENTION

An object of the present invention is to provide a tool turret having a turret head which can be transferred from one angle setting into another angle setting more rapidly than previously known tool turrets.

The foregoing object is obtained by a tool turret, comprising a housing, a turret head coupled to the housing for rotation relative to the housing about a rotary axis, motor means for rotating the turret head relative to the housing, and first and second annular gears mounted coaxially relative to the rotary axis. The first gear is nonrotatably coupled to the turret head. The second gear is nonrotatably coupled to the housing. A locking mechanism part axially slides in the housing relative to the turret head between locking and unlocking positions. The locking mechanisms part has a third annular gear aligned with the first and second gears and engaging the first and second gears in the locking position. Axial drive means, coupled to the locking mechanism part, moves the locking mechanism part between the locking and unlocking positions, and includes a control member rotatable relative to the locking mechanism part. The control member has a first cam race having a shape providing means for thrusting the locking mechanism part into the locking position upon continued rotation of the control member relative to the locking mechanism part in a same direction as preceding rotational movement thereof setting a new angular position of the turret head.

With a tool turret of this type, the drive need not be reversed following indexing in order to bring the operation of the locking mechanism part into engagement with the gearing of the turret head. Thus, the time formerly required for the reversing is spared.

The cam race is preferably configured and arranged to support a ring bearing located between the locking mechanism part and the control member and mounted coaxial to the turret head.

Annular rolls are not mounted rotatably on radially arranged shafts for running on the curved sector. Rather, the cam race serves as a rolling surface for rolling members, which can be spheres or cylinders. Thus, it is advantageous to provide a second cam race in an annular zone of the locking mechanism part aligned and symmetrical to the first cam race. The number of rolling elements in this case determines the pivot or acute path to be covered by the turret head in moving from one established angle setting into some other established angle setting. Basically, however, the cam race could also form one bearing surface of a friction bearing or the like.

In one preferred embodiment each cam race has circumferentially alternating segments in two axially spaced, radial planes. The segments in one plane form recesses between the segments in the other plane.

Insofar as it is required, a stopping device can be provided for the axially slidable part, which is generally the relevant part of the locking mechanism part. Preferably, the stopping device is spring biased rocker member which engages a groove in the locking mechanism part.

Instead of a gear assembly fixed permanently in the direction of rotation between the control member and the power motor, an elastically flexible rotary assembly with the aid of a flexible coupling or clutch can be provided. A flexible clutch device of this type has the advantage that it absorbs and extinguishes intermittent (jerky) torques which can arise in the gearing assembly, both from the drive end and from the turret head. The flexible clutch can have inner and outer rings with mating gears and flexible intermediate members therebetween.

The outer (retaining) ring of the flexible clutch device can be coupled with the control member by means of a form-locking locking-in device.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
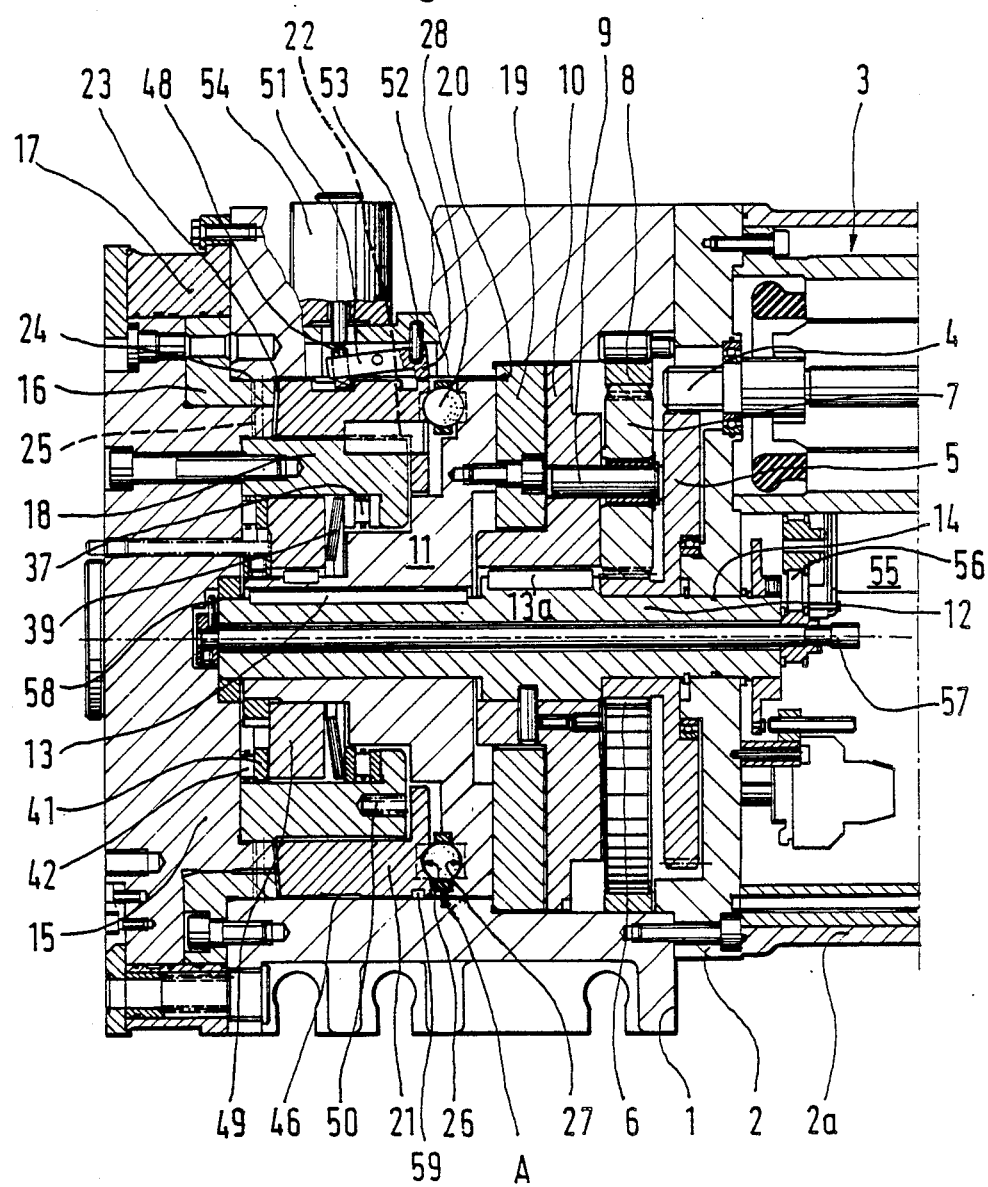
FIG. 1 is a side elevational view in section of a tool turret according to a first embodiment of the present invention.

The tool turret according to the present invention has a housing 1 which can be installed on a machine tool (not shown). The housing is closed off on its right side in the drawing by an only partially shown cup or dome shaped housing cover 2. A drive motor 3 is mounted on housing cover 2, and protrudes into a bonnet 2a which partially surrounds it. A driving pinion 4 projects into a recess in housing over 2 and serves to convey the driving force to a gear wheel 5 mounted rotatably by a roller bearing on a protrusion from the housing cover. Gear wheel 5 is configured to be of one piece with a pinion, which mates with a planet gear 7 of a planetary gearing. The gear teeth of planet gear 7 engage the internal gear teeth of a stationary annular gear 8 connected fixedly with housing 1. Planet gear 7 is mounted rotatably on a trunnion 9 mounted eccentrically in a drive gear 10.

A control member 11 is arranged coaxial to drive gear 10. Drive gear 10 and control member 11 have a hollow shaft 12 passing through them both and connected nonrotatably with one another by means of securing members 13a and 13, respectively. Shaft 12 passes all the way through the pinion 6 by means of a discontinuous part with some play in the bearing and is affixed rotatably in housing cover 2. The clearance between housing cover 2 and shaft 12 is packed by a gasket 14. Shaft 12 projects into a turret head 15 on the left side in FIG. 1. The turret head has axial gear teeth 25 forming a first annular gear. Turret head 15 is affixed radially and axially to an annular ring or member 16 with axial gear teeth 24 forming a second annular gear and is surrounded by an annular housing 17. Both annular members 16 and 17 are fastened in turn to housing 1 by screws. Shaft 12 and turret head 15 can be rotated in either direction.

Control member 11 is surrounded by a hollow, cylindrical connecting member 18 with some clearance in the connection. Connecting member 18 is connected with turret head 15 by screws. A ring bearing 19, connected by screws with control member 11, is contiguous and projects slightly on a shoulder 20 of housing 1. The axial bearing of turret head 15 on annular member 16 and the axial support of ring bearing 19 on housing 1 connected with control member 11 prevents any axial movement of turret head 15 in relation to housing 1.

Figure 2:
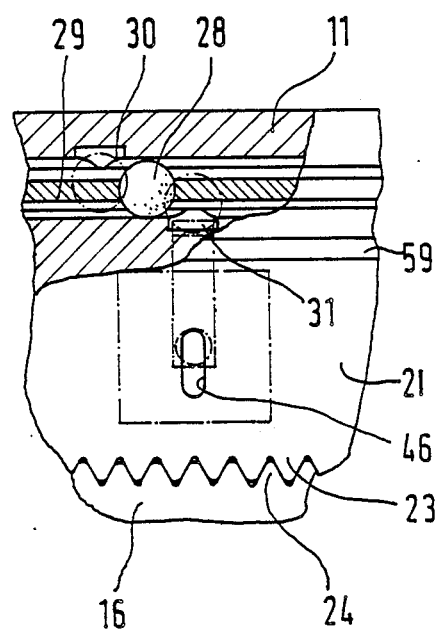
FIG. 2 is a partial top plan view in section of the locking mechanism part of the tool turret, in its locked position.

Connecting member 18 is likewise surrounded with some clearance by a hollow cylindrical type of locking mechanism part 21, which can be moved in axial direction. Locking mechanism part 21 is connected nonrotatably with connecting member 18 by means of a bolt 22 arranged to engage therein with some axial play and parallel to the axis of shaft 12. Locking mechanism part 21 has axial gear teeth 23 forming a third annular gear on its side turned toward turret head 15. Axial gears 24 and 25 engaging and mating with axial gear 23 are located on annular gear 16 and on turret head 15 respectively. Axial gears 24 and 25 are aligned at identical heights and on opposite sides around the periphery. When locking mechanism part 21 is in either position shown in FIGS. 1 and 2, axial gears 23 engage in axial gears 24 and 25 on annular gear 16 and on turret head 15, and thus, prevent rotation of turret head 15 around its axis in relation to annular gear 16.

Figure 3:
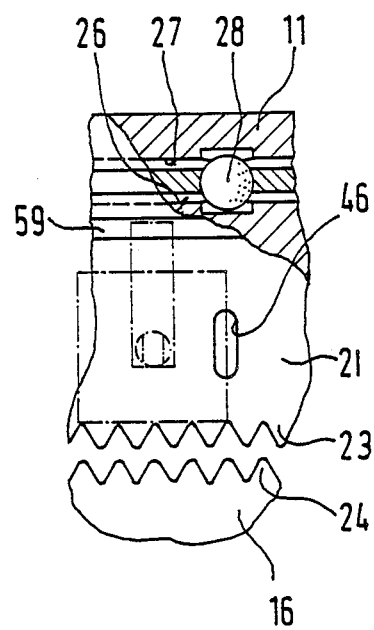
FIG. 3 is a partial top plan view in section of the locking mechanism part of the tool turret of FIG. 1 in its unlocking or release position.

Control member 11 and locking mechanism part 21 together form annular cam or ball races 26 and 27, respectively. These ball races are arranged facing one another and are of identical diameters. Within ball races 26 are 27, ball bearings 28 are located, which ball bearings are held in a bearing cage 29 from which the ball bearings cannot drop out. In each of the ball races, in turn, a number of recesses 30 and 31 corresponding to the number of balls are provided. The recesses are each intended for the gearing or mating of one ball. In the position of the parts shown in FIG. 2, the balls 28 are located outside recesses 30 and 31, so that gear 23 of locking mechanism part 21 engage the gears 24 and 25 of annular gear 16 and turret head 15. In FIG. 3, the balls 28 are received in two recesses 30 and 31 which face one another in control member 11 and locking mechanism part 21, such that gear 23 on locking mechanism part 21 does not engage gears 24 and 25 on annular gear 16 and turret head 15.

Connecting member 18 has a flange which projects inwardly. An axial bearing 37 having cylindrical rolls is supported on the flange. On the part of axial bearing 37, opposite the flange on connecting member 18, rests a set of cup springs 39, supported on a support ring 49. Between support ring 49 and turret head 15, a needle bearing 42 is provided and is supported in the direction of support ring 49 on a bearing plate 41. The needle bearing 42 serves as an axial bearing. Springs 50 are arranged between support or lock mechanism part 21 and connecting member 18. The springs are intended to separate these two parts from one another in axial direction.

On the outside rim of locking mechanism part 21, a rim of perforations 46 is arranged. The perforations are for engaging an indexing bolt 48. Indexing bolt 48 is located on a rocker 51 attached pivotally to housing 1. The end of rocker 51 opposite indexing bolt 48 has a stop member 52. A spring 53 stretched between housing 1 and rocker 51 holds stop part 52 on locking mechanism part 21. For operation of the rocker, a lifting magnet 54 cooperates with indexing bolt 48. The lifting magnet is controlled by an angular setting transmitter 55 driven by an endless gearing belt drive 56. Belt drive 56 is driven by a governing shaft 57 mounted in hollow shaft 12. A radial pin 58 is arranged on governing shaft 57 on the side opposite angular setting transmitter 55. A pin 58 engages in a recess in turret head 15 such that governing shaft 57 executes the same rotary movements as turret head 15.

A locking slot 59 is located on the outside of locking mechanism part 21 in the area of axial bearing 26 to 28 formed of ball races 26, 27 and balls 28. The locking slot engages stop part 52 arranged on rocker 51, when locking mechanism part 21 is in the position shown in FIG. 3.

Through planetary gearing 6 to 9, drive motor 3 powers drive gear 10. Drive gear 10 carries along control member 11 over securing members 13 and 13a and hollow shaft 12. Balls 28 in turn drop into recesses 30 and 31 (FIG. 3). Thus, locking mechanism part 21, under the effect of springs 50, is thrust axially in the direction of drive motor 3 and is moved away from axial gears 24 and 25 on annular gear 16 and turret head 15 to such a distance that the axial gear 23 is beyond the possibility of engagement with axial gears 24 and 25. This position of locking mechanism part 21 is assured by engagement of locking part 52 of rocker 51 in locking grove 59. Turret head 15 follows the rotary movement of control member 11. When turret head 15 has been rotated around a certain angle dependent upon the relevant number of balls 28 and recesses 30 and 31, lifting magnet 54 is then operated by means of a signal from angle setting transmitter 55. As a result of this signal, indexing bolt 48 is forced in the direction of locking mechanism part 21 and engages one aperture 46, and turret head 15 is pre-positioned. At the same time, slip bolt or stop member pivots out of locking groove 59, so that the balls 28, as a result of the force of drive motor 3, are removed from recesses 30 and 31 which are holding them, locking mechanism part 21 is then thrust in the direction of turret head 15, such that axial gear 23 engages in axial gears 24 and 25 on annular gear 16 and on turret head 15 and holds these members tightly in their new rotary or angular setting.

Turret head 15 can also be pivoted in the opposite direction. In that case, motor 3 runs opposite the direction described above.

Figure 4:
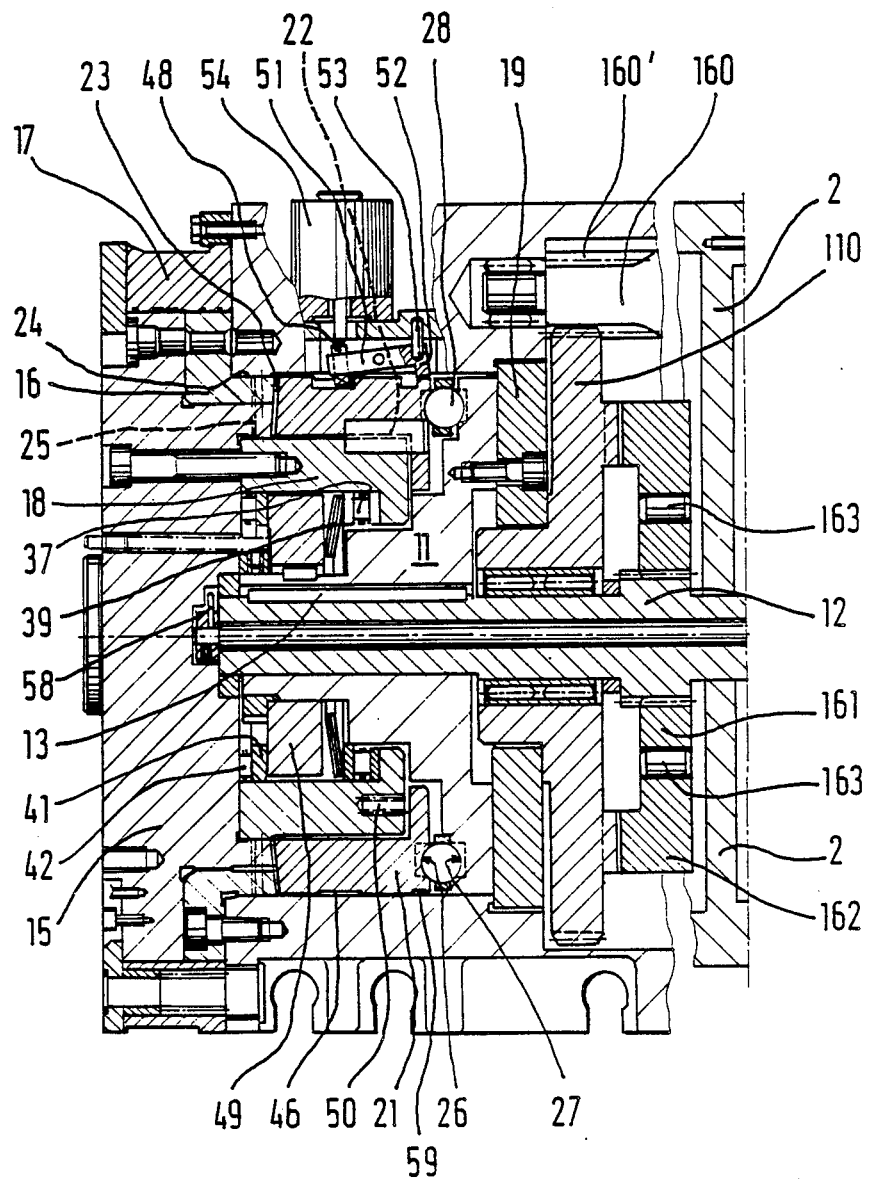
FIG. 4 is a side elevational view in section of a tool turret according to a second embodiment of the present invention.

A secondary exemplary embodiment of a tool turret according to the present invention is shown in FIG. 4. The second embodiment is in part identical to the first exemplary embodiment. The identical parts are indicated with identical reference numbers. The specification hereinafter still relates to the identically configured parts. Only the different parts are described in the following.

Instead of drive gear 10 connected nonrotatably with hollow shaft 12, a gear wheel 110 is mounted rotatably on hollow shaft 12. Gear wheel 110 mates with a pinion 160 on a draft shaft 160 of a reduction gear (not shown) driven by the drive motor.

As shown in FIG. 4, between gear wheel 110 and cover 2 a flexible clutch device is arranged. The flexible clutch device has an inner ring 161 resting nonrotatably on hollow shaft 12, and an outer ring (retaining ring) 162 concentrically surrounding the inner ring. Outer ring 162 has radially extending inside gearing, and inner ring 161 has radially extending outside gearing of corresponding configuration. In both inner and outer rings, the spaces between each two adjacent gear teeth are configured so that the gear of the opposite gear member engaging in these spaces divides the spaces into two at least nearly cylindrical chambers in cross section. In each chamber, without any extra play, lies a rod-shaped attenuator 163 of a rubber-elastic material. Attenuators 163 are pressed together elastically and flexibly in both one and the other direction, and thus, work as shock absorbers.

Gear wheel 110 is connected to outer (retaining) ring 162 in the exemplary embodiment by clutches engaging by lock-fitting one in the other. Instead of this arrangement, however, bolts could be provided, lying parallel to hollow shaft 12 and engaging in bores of gear wheel 110 and outer ring 162.

While various embodiments have been chosen to illustrate the invention, it will be understood by those skilled in the art that various changes and modifications can be made therein without departing from the scope of the invention as defined in the appended claims.

What is claimed is:

1. A tool turret, comprising:
   a housing;
   a turret head coupled to said housing for rotation relative to said housing about a rotary axis;
   motor means for rotating said turret head relative to said housing;
   first and second annular gears mounted coaxially relative to said rotary axis, said first gear being nonrotatably coupled to said turret head, said second gear being nonrotatably coupled to said housing;
   a locking mechanism part axially slidable in said housing relative to said turret head between locking and unlocking positions, said locking mechanism part having a third annular gear aligned with said first and second gears and engaging said first and second gears in said locking position; and
   axial drive means, coupled to said locking mechanism part, for moving said locking mechanism part between said locking and unlocking positions, said axial drive means including a control member rotatable relative to said locking mechanism part, said control member having a first cam race having a shape providing means for thrusting said locking mechanism part into said locking position upon continued rotation of said control member relative to said locking mechanism part in a same direction as preceding rotational movement thereof setting a new angular position of said turret head.

2. A tool turret according to claim 1 wherein said axial drive means comprises at least one ring bearing arranged coaxial to said turret head on said cam race.

3. A tool turret according to claim 2 wherein said ring bearing engages a front surface area of said control member, said front surface area facing said locking mechanism part.

4. A tool turret according to claim 3 wherein said locking mechanism part comprises a second cam race in an annular zone thereof, aligned with and symmetrical to said first cam race.

5. A tool turret according to claim 4 which each of said cam race comprises first and second segments in alternating sequence about a periphery thereof, said first and second segments of each said cam race lying in a first and second planes, respectively, spaced axially along said rotary axis such that said second segments define recesses between said first segments.

6. A tool turret according to claim 5 wherein said axial drive means comprises releasable stop means for preventing axial separation of said first and second cam race when engaged.

7. A tool turret according to claim 6 wherein said stop means comprises a rocker member biased by a spring, one of said control member and said locking mechanism part having a locking groove receiving one end of said rocker member when said stop means is engaged.

8. A tool turret according to claim 1 wherein said control member is nonrotatably connected with a central drive shaft and is driven by said motor means through an elastic clutch means.

9. A tool turret according to claim 8 wherein said elastic clutch means comprises an inner ring nonrotatably mounted on said central drive shaft and an outer ring surrounding said inner ring, said inner and outer rings having mating gears and flexible intermediate members therebetween.

10. A tool turret according to claim 9 wherein said outer ring is coupled to said control member by catch means locking in a rotational direction.

* * * * *